United States Patent
Lee et al.

(10) Patent No.: US 9,571,966 B2
(45) Date of Patent: Feb. 14, 2017

(54) MOBILE DEVICE, SERVER, AND CONTENT MANAGEMENT METHOD FOR A SYSTEM COMPRISING SAME

(75) Inventors: Jong-rim Lee, Seoul (KR); Ju-yun Sung, Yongin-si (KR); Hee-jeong Choo, Anyang-si (KR); Keum-koo Lee, Seongnam-si (KR); Ji-young Kwahk, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/505,568

(22) PCT Filed: Oct. 29, 2010

(86) PCT No.: PCT/KR2010/007553
§ 371 (c)(1),
(2), (4) Date: May 2, 2012

(87) PCT Pub. No.: WO2011/053057
PCT Pub. Date: May 5, 2011

(65) Prior Publication Data
US 2012/0225668 A1    Sep. 6, 2012

(30) Foreign Application Priority Data
Nov. 2, 2009    (KR) .................. 10-2009-0105080

(51) Int. Cl.
| H04W 24/00 | (2009.01) |
| H04W 4/02 | (2009.01) |
| G06F 17/30 | (2006.01) |
| G06Q 30/02 | (2012.01) |
| H04N 21/258 | (2011.01) |

(Continued)

(52) U.S. Cl.
CPC .......... *H04W 4/021* (2013.01); *G06F 17/3087* (2013.01); *G06Q 30/02* (2013.01); *H04L 67/303* (2013.01); *H04N 21/25841* (2013.01); *H04N 21/2668* (2013.01); *H04N 21/4117* (2013.01);
(Continued)

(58) Field of Classification Search
None
See application file for complete search history.

(56) References Cited

U.S. PATENT DOCUMENTS

| 2001/0029531 A1* | 10/2001 | Ohta | ...................... H04L 67/04 |
| | | | 709/223 |
| 2002/0058519 A1* | 5/2002 | Nagahara | ...................... 455/456 |

(Continued)

FOREIGN PATENT DOCUMENTS

| JP | 2002-259089 A | 9/2002 |
| JP | 2008-252692 A | 10/2008 |

(Continued)

*Primary Examiner* — Suhail Khan
(74) *Attorney, Agent, or Firm* — Jefferson IP Law, LLP (57) ABSTRACT

A content managing method of a mobile device, a server, and a system is provided. According to the content managing method, when the mobile device enters into a specific region, the mobile device transmits location information of the location of the mobile device and device information of the mobile device to the server, and the server searches for and transmits content information corresponding to the location information to the mobile device. Accordingly, a user can receive the content information simply by entering into a specific location with the mobile device.

8 Claims, 10 Drawing Sheets

(51) Int. Cl.
  *H04N 21/2668* (2011.01)
  *H04N 21/41* (2011.01)
  *H04L 29/08* (2006.01)
  *H04W 4/18* (2009.01)
  *H04W 8/24* (2009.01)
  *H04W 64/00* (2009.01)

(52) U.S. Cl.
  CPC ............... *H04W 4/02* (2013.01); *H04W 4/18* (2013.01); *H04W 8/24* (2013.01); *H04W 64/00* (2013.01)

(56) References Cited

U.S. PATENT DOCUMENTS

| | | | |
|---|---|---|---|
| 2002/0115451 A1* | 8/2002 | Taniguchi et al. | 455/456 |
| 2002/0133545 A1* | 9/2002 | Fano et al. | 709/203 |
| 2007/0124436 A1* | 5/2007 | Shepherd | 709/223 |
| 2007/0299681 A1 | 12/2007 | Plastina et al. | |
| 2009/0187466 A1* | 7/2009 | Carter et al. | 705/10 |
| 2010/0004003 A1* | 1/2010 | Duggal et al. | 455/456.3 |
| 2011/0076941 A1* | 3/2011 | Taveau et al. | 455/41.1 |

FOREIGN PATENT DOCUMENTS

| | | |
|---|---|---|
| JP | 2009-139991 A | 6/2009 |
| KR | 10-0718795 B1 | 5/2007 |
| KR | 10-0726075 B1 | 6/2007 |

\* cited by examiner

MOBILE DEVICE, SERVER, AND CONTENT MANAGEMENT METHOD FOR A SYSTEM COMPRISING SAME

PRIORITY

This application is a National Stage application under 35 U.S.C. §371 of an International application filed on Oct. 29, 2010 and assigned application No. PCT/KR2010/007553, and claims the benefit under 35 U.S.C. §365(b) of a Korean patent application filed Nov. 2, 2009 in the Korean Intellectual Property Office and assigned application No. 10-2009-0105080, the entire disclosure of which is hereby incorporated by reference.

BACKGROUND OF THE INVENTION

1. Field of the Invention

The present invention relates to a method for managing contents of a mobile device, a server, and a system. More particularly, the present invention relates to a method for managing content of a mobile device, a server, and a system so that the server provides adequate content to the mobile device connected over a communication network such as Internet.

2. Description of the Related Art

Thanks to recent advances of communication technologies, a user can download various content using a mobile device. For example, the user can download content such as music or game by use of a mobile phone. Using the mobile device, the user may download necessary data by accessing a server.

As such, the user can download various content using the mobile device, whereas it is quite complicated to download the intended content according to a user's location. Since the mobile device is small in size, content represented on its screen are small. Accordingly, the user can access the server, search for the intended content, and then download the content through a number of steps using the mobile device.

The user wants to download the content in a simple manner. Accordingly, what is needed is a method for easily downloading the content according to the situation using the mobile device.

SUMMARY OF THE INVENTION

Aspects of the present invention are to address at least the above-mentioned problems and/or disadvantages and to provide at least the advantages described below. Accordingly, an aspect of the present invention is to provide a method for managing content of a mobile device, a server, and a system such that, when a location of the mobile device enters into a specific region, the mobile device transmits location information relating to the location of the mobile device and device information of the mobile device to the server and the server searches for and transmits content information corresponding to the location information to the mobile device.

According to an aspect of the present invention, a content managing method of a mobile device capable of communicating with a server is provided. The method includes when the mobile device enters into a specific region, transmitting location information of a location of the mobile device and device information of the mobile device to the server, and receiving content information corresponding to the location information from the server.

The content managing method may further include transmitting command information input by a user to the server.

The command information may be a print command to print a content corresponding to the content information.

The content corresponding to the content information may be a document.

The content managing method may further include transmitting the print command of the content to a printer.

The content managing method may further include searching for a printer corresponding to the location information of the mobile device. The transmitting of the print command of the content to the printer may including transmitting the print command to the searched printer.

The location information may be detected by a Global Positioning System (GPS).

The content information corresponding to the location information may be content used at a location corresponding to the location information and be information relating to content registered to the server.

According to another aspect of the present invention, a content managing method of a server capable of communicating with a mobile device is provided. The method includes when the mobile device enters into a specific region, receiving location information of the location of the mobile device and device information of the mobile device from the mobile device, searching for content information corresponding to the received location information, and transmitting the searched content information to the mobile device.

The content managing method may further include receiving command information input by a user from the mobile device.

According to an aspect of the present invention, a content managing method of a content management system comprising a mobile device and a server capable of communicating with each other is provided. The method includes when a location of the mobile device enters into a specific region, transmitting, at the mobile device, location information of the location of the mobile device and device information of the mobile device to the server, searching for, at the server, content information corresponding to the location information, and transmitting, at the server, the searched content information to the mobile device.

In accordance with another aspect of the present invention, a mobile device is provided. The mobile device includes a communication unit for transmitting location information to a server and for receiving content information related to the location information from the server, a location determining unit for determining a location of the mobile device, and a controller for generating the location information based on the location determined by the location determining unit and for controlling the communication unit to transmit the location information to the server.

According to exemplary embodiments of the present invention, the content managing method of the mobile device, the server, and the system is provided to, when the location of the mobile device enters into the specific region, transmit the location information of the location of the mobile device and the device information of the mobile device from the mobile device to the server and to search for and transmit the content information corresponding to the location information from the server to the mobile device. Thus, the user can receive the content information by merely entering into the specific location with the mobile device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF THE EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
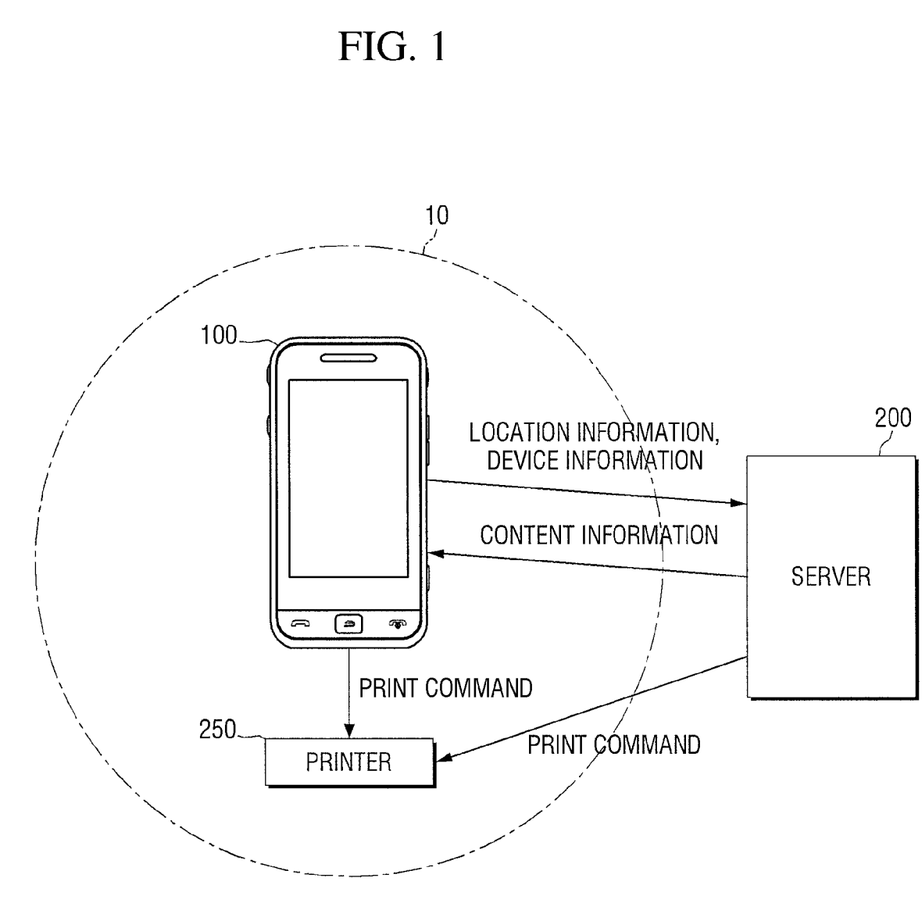
FIG. 1 is a diagram of a content management system including a mobile device, a server, and a printer according to an exemplary embodiment of the present invention.

FIG. 1 is a diagram of a content management system including a mobile device, a server, and a printer according to an exemplary embodiment of the present invention.

Referring to FIG. 1, the content management system includes a mobile device 100, a server 200, and a printer 250. When the mobile device 100 enters into a specific region 10, the content management system provides a function allowing the mobile device 100 to download content relating to the specific region 10 from the server 200 or allowing the printer 250 to print document content relating to the specific region 10.

When the mobile device 100 enters into the specific region, the mobile device 100 transmits location information of the current location of the mobile device 100 and device information of the mobile device 100 to the server 200. The mobile device 100 detects the current location and recognizes the entrance of the mobile device 100 to the specific region as an event for transmitting the location information and the device information to the server 200. The mobile device 100 may detect the current location using a Global Positioning System (GPS). The mobile device 100 may detect the current location using a mobile communication base station or a wireless Access Point (AP).

The specific region is an area preset by a user in the mobile device 100. The specific region may be set using at least one of GPS coordinate information, mobile communication base station location information, and wireless AP location information. For example, when a specific region is set for the house, the mobile device 100 may set a 5-meter radius of the house as the specific region using the GPS coordinate information.

The location information of the mobile device 100 is information indicating the current location of the mobile device 100. The location information of the mobile device 100 may be the GPS coordinate information or the location information of the mobile communication base station or the wireless AP currently connected with the mobile device 100. When the mobile device 100 is in a GPS signal reception area (for example, the outdoors), the mobile device 100 may detect the location information using the GPS. When the mobile device 100 is in a GPS non-reception area (for example, inside the building), the mobile device may detect the location information of the mobile device 100 using the location information of the mobile communication base station or the wireless AP.

The device information of the mobile device 100 is information for specifying the mobile device 100, and includes device information and user information of the mobile device 100. The device information of the mobile device 100 includes at least one of a model name, a manufacturer, serial numbers, and a user ID.

The mobile device 100 receives content information corresponding to the location information from the server 200. The content information corresponding to the location information indicates information of content relating to the current specific region. The content information may be a list of the content relating to the specific region, or the content itself. For example, when the specific region is the house, the content information may be homework information and preparation information. When the specific region is a conference room, the content information may be meeting material information. The content information may be set by the user to correspond to the location information, or may be mapped to the location information in advance by a content creator. For example, the content creator may generate and upload content to the server 200 after presetting the download location information in the content.

The mobile device 100 transmits command information input by the user to the server 200. The command information indicates a command for processing the content information received from the server 200.

For example, the command information may include a print command for the content corresponding to the received content information. The command information may be the print command to print the content corresponding to the content information. In this case, the content is a document. The mobile device 100 sends the print command of the document content to the server 200.

The command information may be a download command for the content corresponding to the received content information. When the mobile device 100 sends the content download command to the server 200, the mobile device 100 downloads the corresponding content from the server.

The mobile device 100 may directly send the print command of the content corresponding to the received content information, to the printer 250. In this case, the mobile device 100 first searches for the closest printer in the specific region, for example the printer 250. The mobile device 100 sends the print command to the printer 250. The printer 250 may then print the content.

The server 200 functions to provide the content to the mobile device 100. When the mobile device 100 enters into the specific region, the server 200 receives the location information relating to the location of the mobile device 100 and the device information of the mobile device 100 from the mobile device 100.

Using the received device information, the server 200 may identify the mobile device 100 currently entering into the specific region. The server 200 searches for the content information corresponding to the received location information. The server 200 transmits the searched content information to the mobile device 100.

For this purpose, the server 200 stores device information of various devices. Accordingly, the server 200 matches the device information of the mobile device 100 to one of the stored device information and recognizes the mobile device 100 using the matching device information. The server 200 stores various location information and their corresponding content. When receiving the location information from the mobile device 100, the server 200 searches for the content corresponding to the location information and transmits information of the searched content to the mobile device 100.

The server 200 receives the command information input by the user from the mobile device 100. When the command information is the print command, the server 200 searches for the printer corresponding to the location information of the mobile device 100. The server 200 searches for the printer closest to the mobile device 100. The server 200 may search for the printer closest to the mobile device 100 by comparing location information of printers pre-registered and the received location information of the mobile device 100. The server 200 sends the print command to the searched printer 250. The printer 250 prints the content corresponding to the content information.

A driver of the printer 250 may be needed to print the content. The driver of the printer 250 may be installed to the server 200. When the driver of the printer 250 is not installed to the server 200, the server 200 may transmit the print command and the content to a certain device (for example, a PC or a notebook) of the installed driver of the printer 250. The certain device prints the content using the printer 250.

When the command information is the content download command, the server 200 transmits the content corresponding to the download command to the mobile device 100. Based on the received device information of the mobile device 100, the server 200 may change the content into the playable form of the mobile device 100 and transmit the content. For example, when a resolution of the content is 1920*1080 and a resolution of the mobile device 100 is 480*240, the server 200 converts the resolution of the content to 480*240 based on the device information of the mobile device 100 and transmits the converted content to the mobile device 100.

The printer 250 prints the content (for example, document content) according to the received print command. The printer 250 is a network printer which may communicate over the network.

Using the content management system as shown in FIG. 1, the user can confirm the content information corresponding to the current location through the mobile device 100 and automatically print the content relating to the current location by merely putting the mobile device 10 into the specific region 10.

When the user's particular manipulation is input after detecting the current location entering into the specific region, the mobile device 100 may transmit the location information of the current location and the device information to the server 200. When the current location is inside the specific region and the user's particular manipulation is input, the mobile device 100 transmits the location information and the device information to the server 200.

For example, when the mobile device 100 enters into the specific region, the mobile device 100 displays a message informing the user of the entry into the specific region on a screen. When the user presses a particular button of the mobile device 100, the mobile device 100 may transmit the location information and the device information to the server 200. The mobile device 100 receives the content information relating to the current location from the server. The particular manipulation may include shaking the mobile device 100 or taking a picture, in addition to the pressing of the particular button.

For example, when the user presses a particular button of the mobile device 100 around a movie theatre, the mobile device 100 may download movie discount coupon information from the server 200. When the user presses a particular button of the mobile device 100 at home, the mobile device 100 may download the homework of the day from the server 200 and print the homework using the network printer at home. When the user shakes the mobile device 100 at a subway station, the mobile device 100 may download subway station information (for example, last train time, exit information, etc.) from the server 200 and display the subway station information on the screen.

Structures of the mobile device 100 and the server 200 are described below with respect to FIG. 2.

Figure 2:
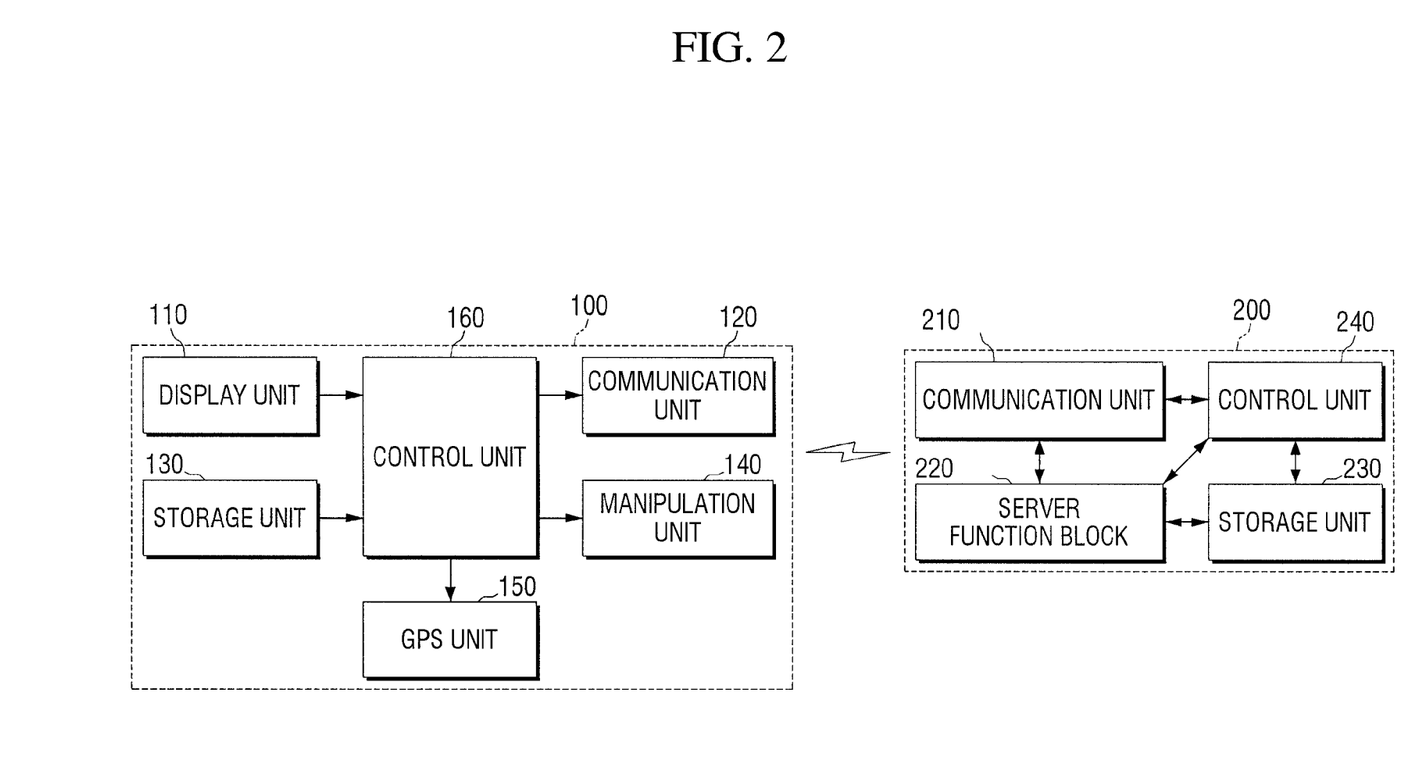
FIG. 2 is a block diagram of a mobile device and a server according to an exemplary embodiment of the present invention.

FIG. 2 is a block diagram of a mobile device and a server according to an exemplary embodiment of the present invention.

Referring to FIG. 2, the mobile device 100 includes a display unit 110, a communication unit 120, a storage unit 130, a manipulation unit 140, a GPS unit 150, and a control unit 160.

The display unit 110 displays an image for providing the functions of the mobile device 100. The display unit 110 displays Graphical User Interfaces (GUIs) for the user's manipulation on the screen. The display unit 110 may display the received content information on the screen.

The communication unit 120 is connected to access the server 200 over a mobile communication network or Internet. The mobile communication network may be a Group Special Mobile (GSM) communication network or a Wideband Code Division Multiple Access (WCDMA) communication network. The communication unit 120 is connected to the mobile communication network 120 via the mobile communication base station. The communication unit 120 is connected to the Internet via the wireless AP.

The communication unit 120 transmits and receives various information to and from the server 200. When the current location enters into the specific region, the communication unit 120 transmits the location information of the current location of the mobile device 100 and the device information of the mobile device 100 to the server 200.

The communication unit 120 transmits the command information input by the user to the server 200. The command information indicates the command for processing the content information received from the server 200.

The storage unit 130 stores programs for executing the various functions of the mobile device 100. The storage unit 130 stores the downloaded content information. The storage unit 130 may be implemented using a hard disc, a non-volatile memory, and so on.

The manipulation unit 140 receives and sends the user's manipulation to the controller 160. The manipulation unit 140 receives a content selection command and the print command using the content information from the user. The manipulation unit 140 can be a button disposed on the mobile device 100 or a touch screen.

The GPS unit 150 detects the current location information of the mobile device 100. The GPS unit 150 detects the location information in the form of GPS coordinate information including latitude and longitude information. The GPS unit 150 sends the detected location information to the control unit 150.

The control unit 160 controls the operations of the mobile device 100. In detail, the control unit 160 detects whether the mobile device 100 enters into the specific region using the location information detected through the GPS unit 150. When the control unit 160 determines that the mobile device 100 enters into the specific region, the control unit 160 controls to transmit the location information of the current location of the mobile device 100 and the device information of the mobile device 100 to the server 200.

The control unit 160 detects the current location and recognizes the entry into the specific region as the event for transmitting the location information and the device information to the server 200. The control unit 160 may detect the current location through the GPS unit 150. The control unit 160 may detect the current location using the mobile communication base station or the wireless AP connected through the communication unit 120. The control unit 160 may periodically detect the current location. For example, the control unit 160 may control to operate the GPS unit 150 once every five minutes to detect the coordinates of the current location.

When the mobile device 100 is in the GPS signal reception area (for example, the outdoors), the control unit 160 may detect the location information using the GPS unit 150. When the mobile device 100 is in the GPS non-reception area (for example, inside the building), the control unit 160 may detect the location information of the mobile device 100 using the location information of the mobile communication base station or the wireless AP connected through the communication unit 120.

The control unit 160 controls to transmit the command information input by the user to the server 200. The command information indicates the command for processing the content information received from the server 200.

For example, the command information may include the print command for the content corresponding to the received content information. The command information may be the print command to print the content corresponding to the content information. In this case, the content is the document. The control unit 160 controls to send the print command of the document content to the server 200.

The control unit 160 may control to directly send the print command of the content corresponding to the received content information, to the printer 250. In this case, the control unit 160 searches for the closest printer in the specific region, such as the printer 250. The control unit 160 controls to send the print command to the printer 250. The printer 250 may then print the content.

When the user's particular manipulation is input after the current location entrance of the mobile device 100 into the specific region is detected, the control unit 160 may control to transmit the location information of the current location of the mobile device 100 and the device information of the mobile device 100 to the server 200. When the current location is inside the specific region and the user's particular manipulation is input, the control unit 160 may control to transmit the location information and the device information to the server 200. For example, when the mobile device 100 enters into the specific region, the control unit 160 may displays the message on the screen informing the user that the mobile device 100 has entered into the specific region. When the user presses a particular button of the mobile device 100, the control unit 160 may control to transmit the location information and the device information to the server 200. The particular manipulation may include shaking the mobile device 100 or taking a picture, in addition to the pressing of the particular button.

The control unit 160 may pass through an authentication process by transmitting the device information to the server 200. Using the device information, the server 200 may authenticate the content download right of the control unit 160.

As shown in FIG. 2, the server 200 includes a communication unit 210, a server function block 220, a storage unit 230, and a control unit 240.

The communication unit 210 is connected to access the mobile device 100 over the Internet. The communication unit 210 can be realized using a network interface such as wired LAN or wireless LAN.

The server function block 220 performs functions of the server 200. For example, the server function block 220 executes an operating system so that the server 200 functions as the server, and executes various programs.

The storage unit 230 stores content corresponding to various specific regions. The content may include video content, photo content, music content, and documents. For example, when the specific region is the house, the content may be content relating to the homework or the preparation. When the specific region is the conference room, the content information may be meeting materials. The storage unit 230 stores device information of various devices to recognize the mobile device 100.

The control unit 240 controls the operations of the server 200. The control unit 240 controls to provide the content to the mobile device 100. When the mobile device 100 enters into the specific region, the control unit 240 receives the location information of the location of the mobile device 100 and the device information of the mobile device 100 from the mobile device 100. The control unit 240 searches for the content information corresponding to the received location information. The control unit 240 controls to transmit the searched content information to the mobile device 100.

The control unit 240 receives the command information input by the user from the mobile device 100. When the command information is the print command, the control unit 240 searches for the printer corresponding to the location information of the mobile device 100. The control unit 240 searches for the printer closest to the mobile device 100. The control unit 240 searches for the printer closest to the mobile device 100 by comparing the location information of the pre-registered printers and the received location information of the mobile device 100. The control unit 240 controls to send the print command to the searched printer 250. The printer 250 prints the content corresponding to the content information.

Using the mobile device 100 and the server 200 according to exemplary embodiments of the present invention, the user can confirm the content information corresponding to the current location through the mobile device 100 and automatically print the content relating to the current location by merely carrying the mobile device 10 into the specific region 10.

Hereafter, a content managing method is described below with respect to FIGS. 3 and 4.

Figure 3:
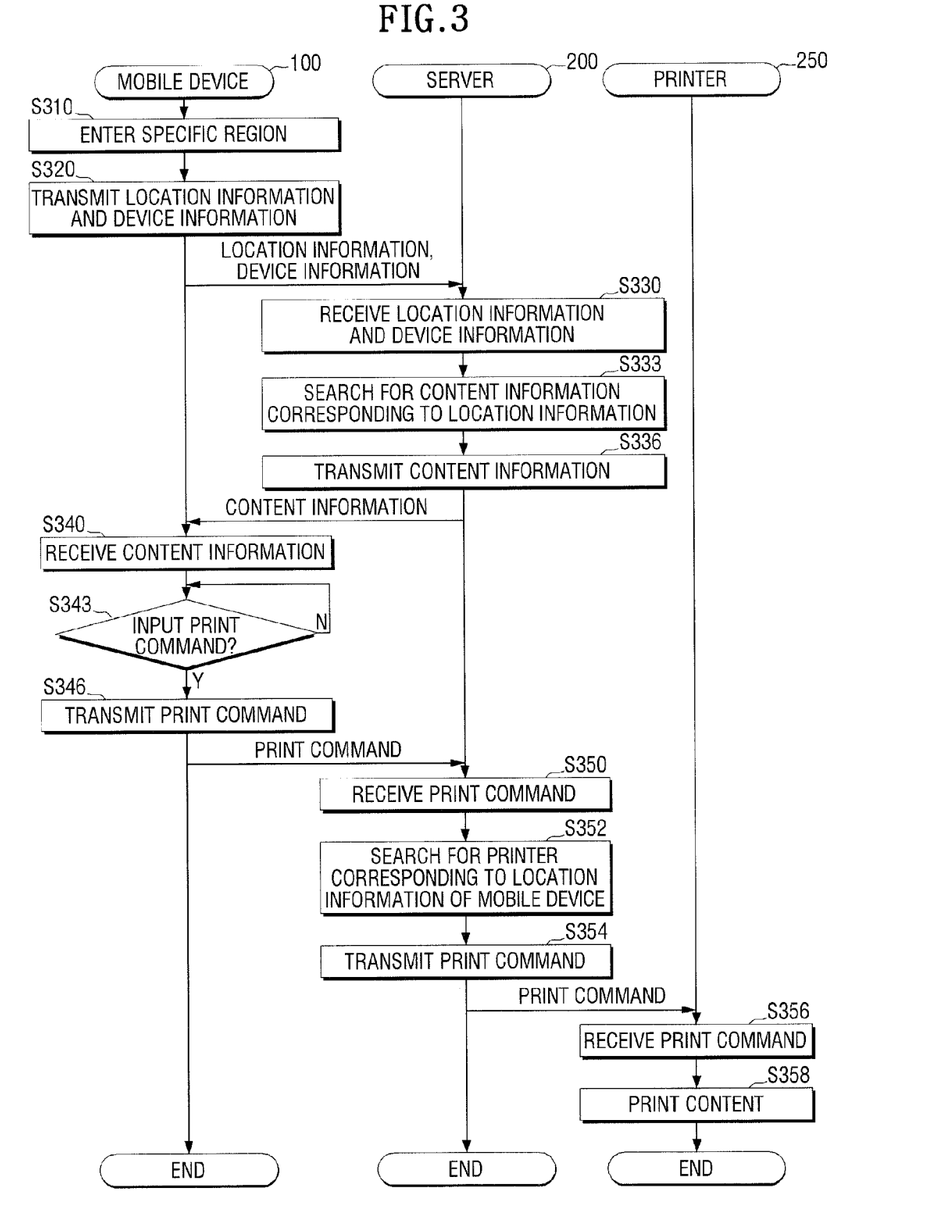
FIG. 3 is a flowchart of a content managing method when a server transmits a print command according to an exemplary embodiment of the present invention.

FIG. 3 is a flowchart of a content managing method when a server transmits the print command according to an exemplary embodiment of the present invention.

The mobile device 100 detects whether the mobile device 100 enters into the specific region in step S310. When the mobile device 100 enters into the specific region, the mobile device 100 transmits the location information of the current location of the mobile device 100 and the device information of the mobile device 100 to the server 200 in step S320. The mobile device 100 recognizes the specific region entrance of the current location as the event for transmitting the location information and the device information to the server 200. The mobile device 100 may detect the current location through the GPS. The mobile device 100 may detect the current location using the mobile communication base station or the wireless AP. When the mobile device 100 is in the GPS signal reception area (for example, the outdoors), the mobile device 100 may detect the location information using the GPS. When the mobile device 100 is in the GPS non-reception area (for example, inside the building), the mobile device 100 may detect the location information of the mobile device 100 using the location information of the mobile communication base station or the wireless AP.

The server 200 receives the location information of the location of the mobile device 100 and the device information of the mobile device 100 from the mobile device 100 in step S330. The server 200 searches for the content information corresponding to the received location information in step S333. The server 200 transmits the searched content information to the mobile device 100 in step S336.

The mobile device 100 receives the content information corresponding to the location information from the server 200 in step S340. The content information corresponding to the location information indicates the information of the content relating to the current specific region. The content information may be the list of the content relating to the specific region, or the content itself. For example, when the specific region is the house, the content information may be the homework information and the preparation information. When the specific region is the conference room, the content information may be the meeting material information.

When the user inputs the print command in step S343, the mobile device 100 sends the input command information to the server 200 (S346). At this time, the content is the document.

The server 200 receives the print command input by the user from the mobile device 100 in step S350. The server 200 searches for the printer corresponding to the location information of the mobile device 100 in step S352. The server 200 searches for the printer closest to the mobile device 100. The server 200 searches for the printer closest to the mobile device 100 by comparing the location information of the pre-registered printers and the received location information of the mobile device 100.

The server 200 sends the print command to the searched printer 250 in step S354. The printer 250 receives the print command in step S356 and prints the content corresponding to the content information in step S358.

Then the mobile device 100 enters into the specific region, the server 200 prints the content relating to the specific region at the printer 250.

When the mobile device 100 can communicate with the printer 250, the mobile device 100 may directly send the print command of the content corresponding to the received content information, to the printer 250, which is described below with respect to FIG. 4.

Figure 4:
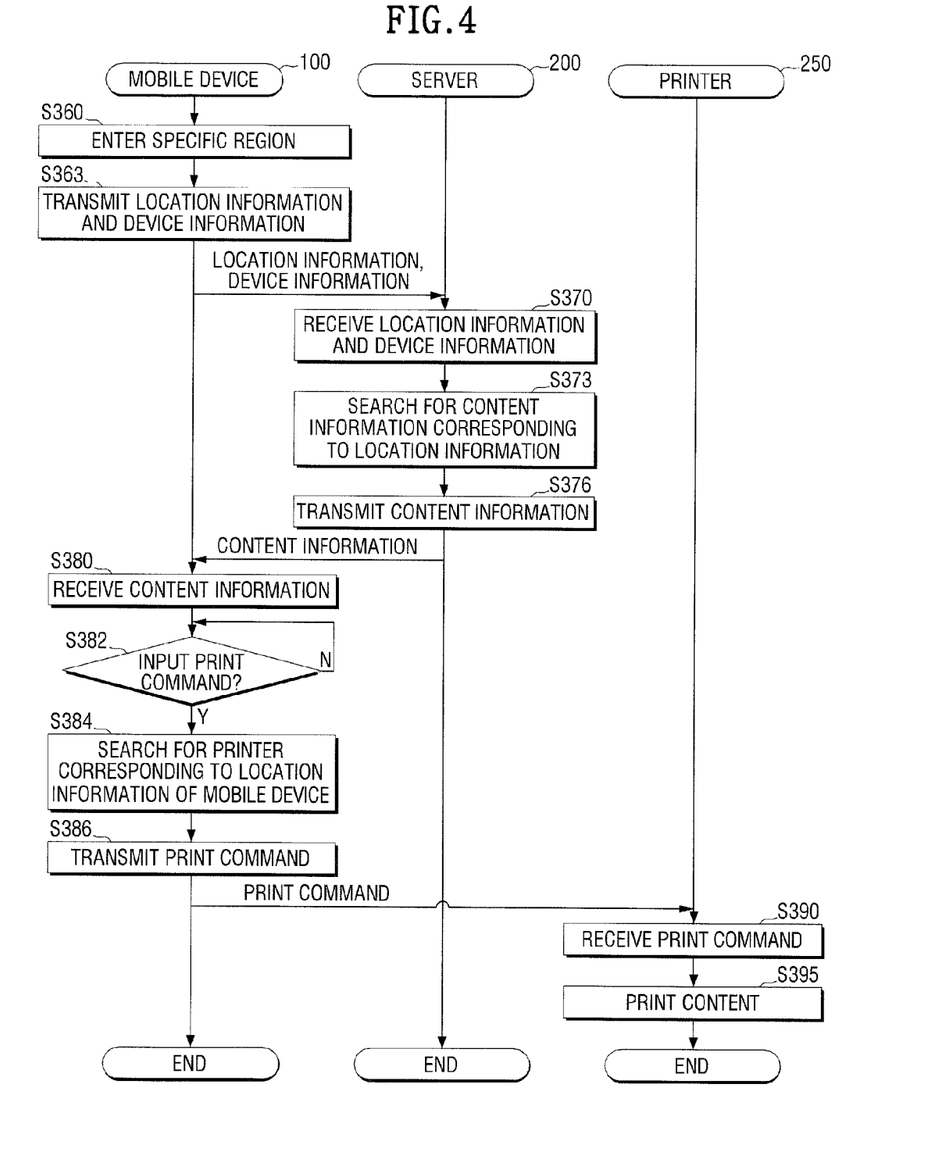
FIG. 4 is a flowchart of a content managing method when a mobile device transmits a print command according to an exemplary embodiment of the present invention.

FIG. 4 is a flowchart of the content managing method when a mobile device transmits the print command according to an exemplary embodiment of the present invention.

The mobile device 100 detects whether the current location enters into the specific region in step S360. When the mobile device 100 enters into the specific region, the mobile device 100 transmits the location information of the current location of the mobile device 100 and the device information of the mobile device 100 to the server 200 in step S363. The mobile device 100 recognizes the entry into the specific region as the event for transmitting the location information and the device information to the server 200. The mobile device 100 may detect the current location using the GPS. The mobile device 100 may detect the current location using the mobile communication base station or the wireless AP. When the mobile device 100 is in the GPS signal reception area (for example, the outdoors), the mobile device 100 may detect the location information using the GPS. When the mobile device 100 is in the GPS non-reception area (for example, inside the building), the mobile device may detect the location information of the mobile device 100 using the location information of the mobile communication base station or the wireless AP.

The server 200 receives the location information of the location of the mobile device 100 and the device information of the mobile device 100 from the mobile device 100 in step S370. The server 200 searches for the content information corresponding to the received location information in step S373. The server 200 transmits the searched content information to the mobile device 100 in step S376.

The mobile device 100 receives the content information corresponding to the location information from the server 200 in step S380. The content information relating to the location information indicates the information of the content relating to the current specific region. The content information may be the list of the content relating to the specific region, or the content itself. For example, when the specific region is the house, the content information may be the homework information and the preparation information. When the specific region is the conference room, the content information may be the meeting material information.

When the user inputs the print command in step S382, the mobile device 100 searches for the printer corresponding to the current location information in step S384. The mobile device 100 searches for the closest printer. The mobile device 100 searches for the closest printer by comparing the location information of the pre-registered printers and the detected current location information.

The mobile device 100 sends the print command to the searched printer 250 in step S386. The printer 250 receives the print command in step S390 and recognizes the content corresponding to the content information in step S395.

Accordingly, when the mobile device 100 enters into the specific region, the mobile device 100 prints the content relating to the specific region using the printer 250.

According to the content managing method according to exemplary embodiments of the present invention, the user can confirm the content information corresponding to the current location through the mobile device 100 and automatically print the content relating to the current location by merely carrying the mobile device 10 into the specific region 10.

FIGS. 5 through 9 are diagrams of a house related content information providing and printing process when a mobile device enters into a region corresponding to a house according to an exemplary embodiment of the present invention.

Referring to FIGS. 5-9, FIG. 5 depicts the specific region 10 which is set to a circular region of a certain radius based on the house. The specific region 10 is set to the house region. The mobile device 100 sets the specific region 10 using the GPS coordinate information around the house, or sets the specific region 10 using the location information of the mobile communication base station or the wireless AP installed near the house. The printer 250 is disposed inside the house and the server 200 is disposed outside.

Figure 5:
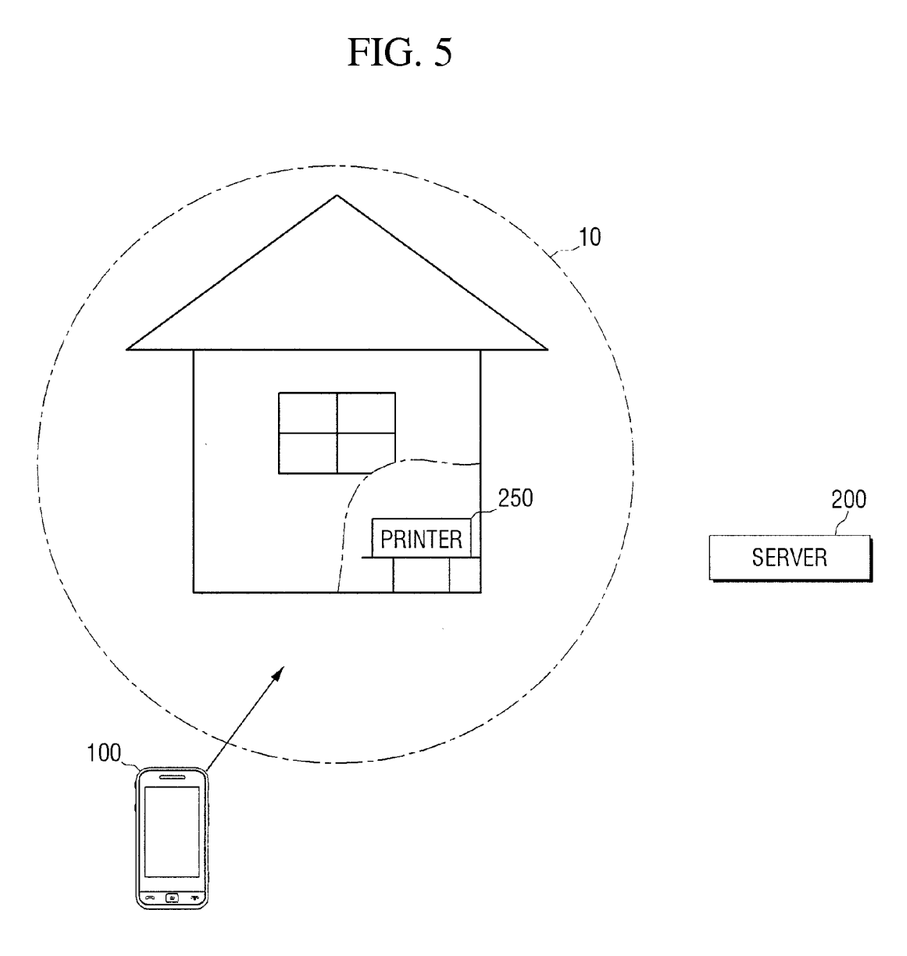
FIGS. 5 through 9 are diagrams of a house related content information providing and printing process when a mobile device enters into a region corresponding to a house according to an exemplary embodiment of the present invention.
Figure 6:
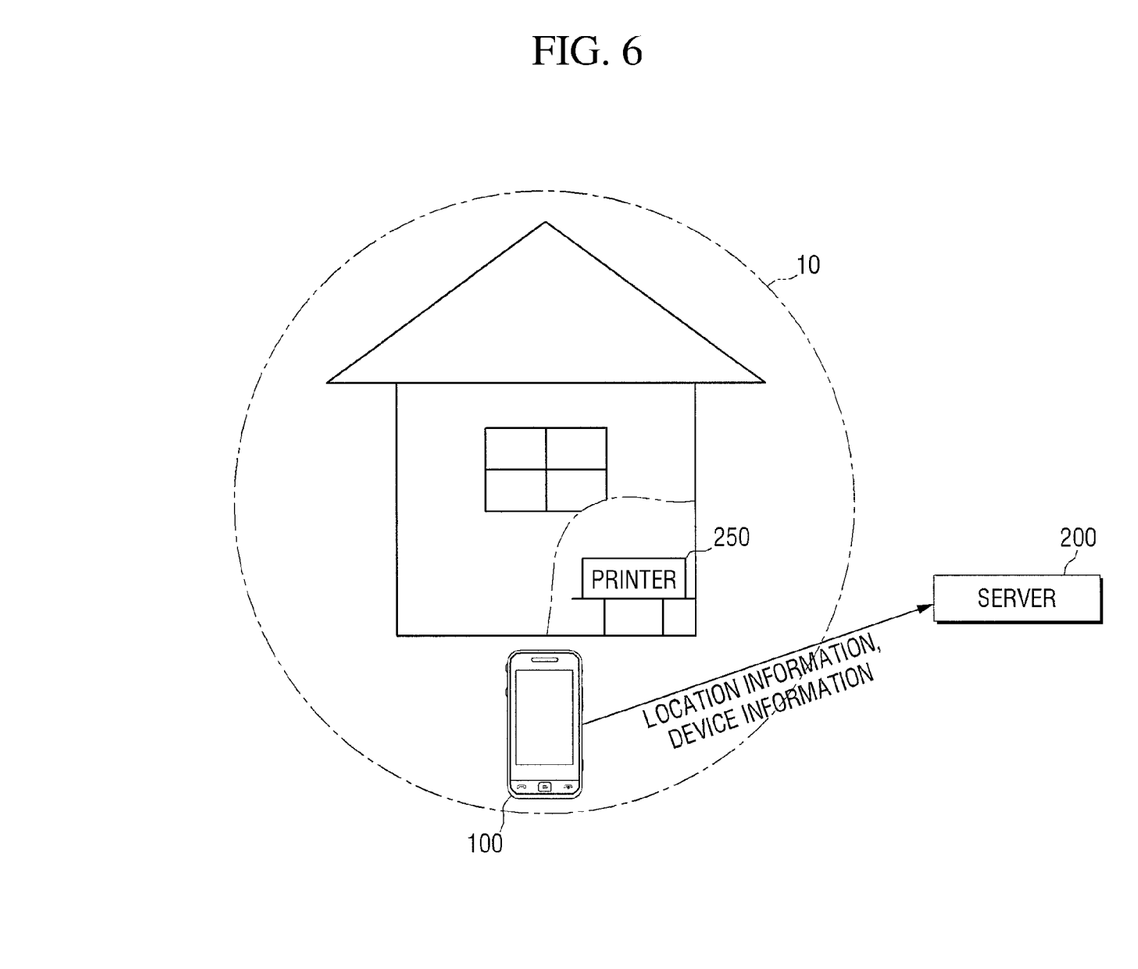

In FIG. 5, the mobile device 100 does not enter into the specific region 10 yet. When the user puts the mobile device 100 into the specific region 10, the mobile device 100 transmits the location information and the device information to the server 200 as shown in FIG. 6.

Figure 7:
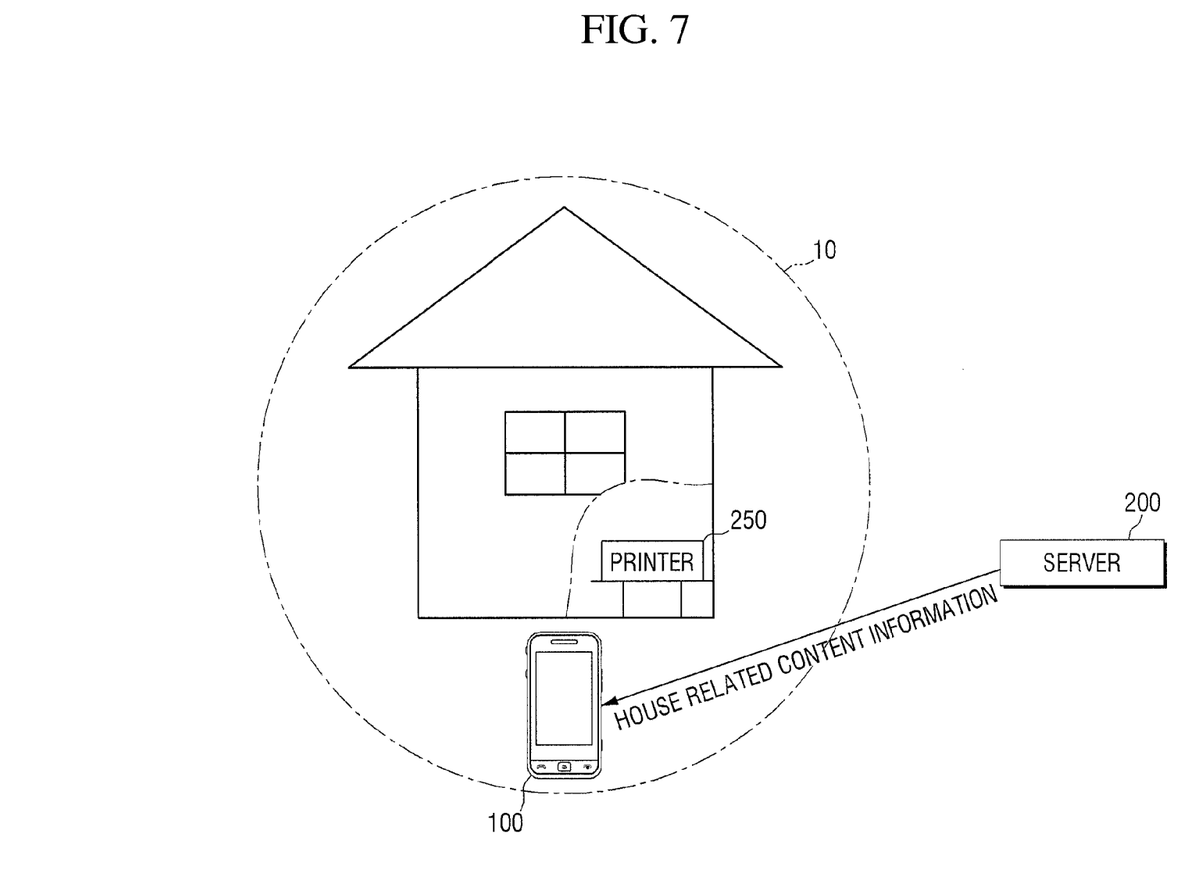

In response, the server 200 transmits content information relating to the house to the mobile device 100 as shown in FIG. 7. For example, the content information relating to the house may be the homework information, the preparation information, and the like.

When the mobile device 100 receives the content information from the server 200, the user can confirm the content relating to the house (for example, homework and preparation) through the screen of the mobile device 100. The user can input the print command for the house related content through the mobile device 100. When the user inputs the print command, the mobile device 100 processes to print the house related content.

Figure 8:
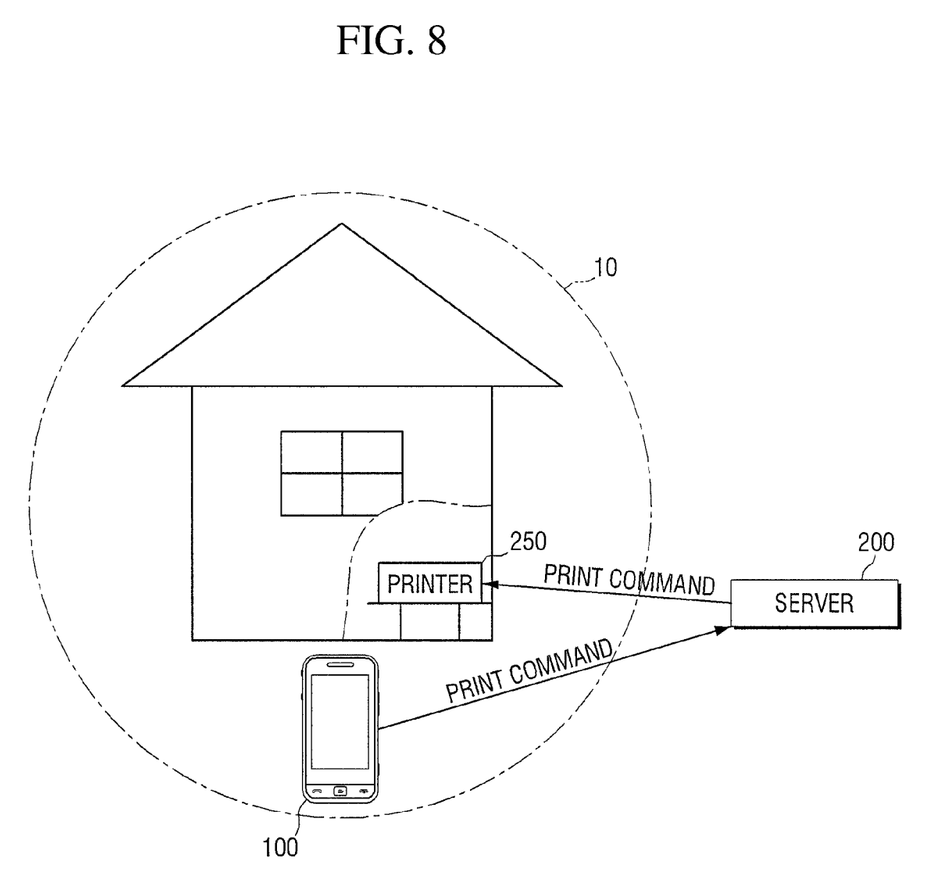
Figure 9:
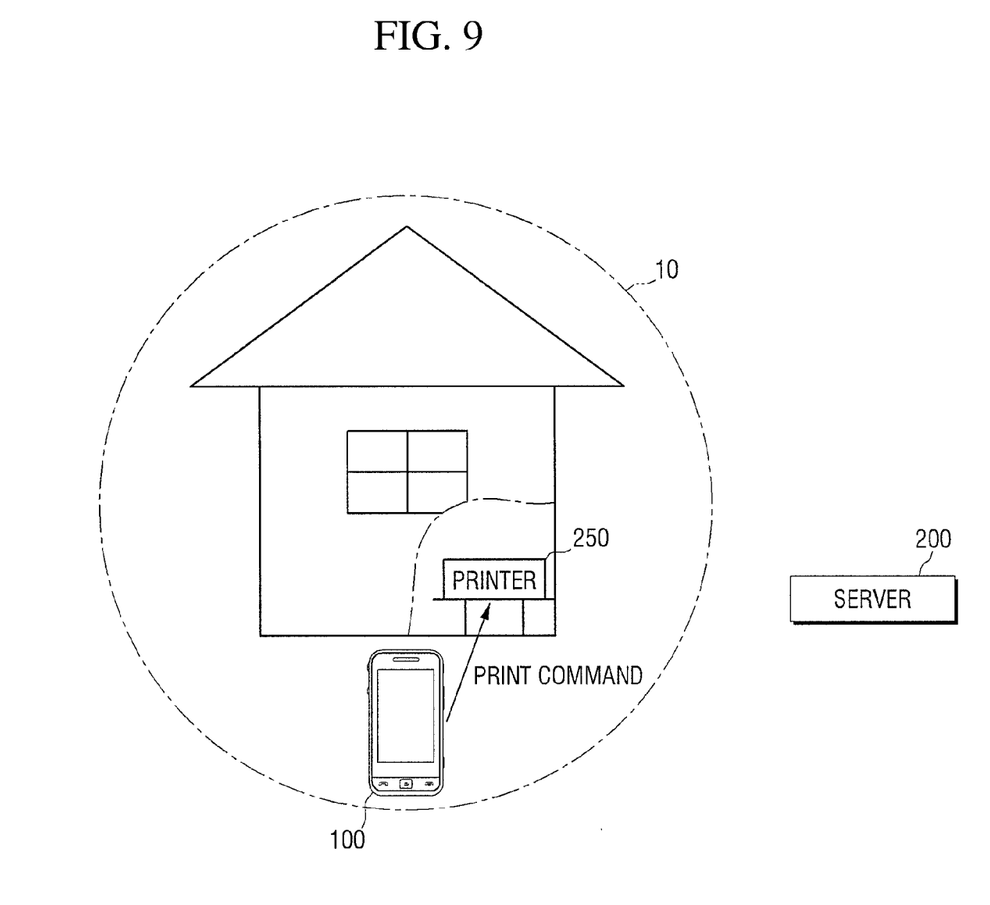

When the mobile device 100 cannot communicate with the printer 250 as shown in FIG. 8, the mobile device 100 sends the print command to the server 200 and the server 200 sends the print command to the printer 250. When the mobile device 100 can communicate with the printer 250 as shown in FIG. 9, the mobile device 100 sends the print command directly to the printer 250. Accordingly, when entering into the house, the mobile device 100 receives the house related content from the server 200 and prints through the printer 250.

As a result, the user can check the homework and the preparation material, which are the house related content, through the mobile device 100 simply by carrying the mobile device 100 near the house. Also, since the user can use the mobile device 100 to print the homework and the preparation material using the printer 250 at home, the user can obtain the homework and the preparation material printed from the printer 250 at home simply by carrying the mobile device 100 home.

An example in which the specific region is set to the conference room is described below with respect to FIG. 10.

Figure 10:
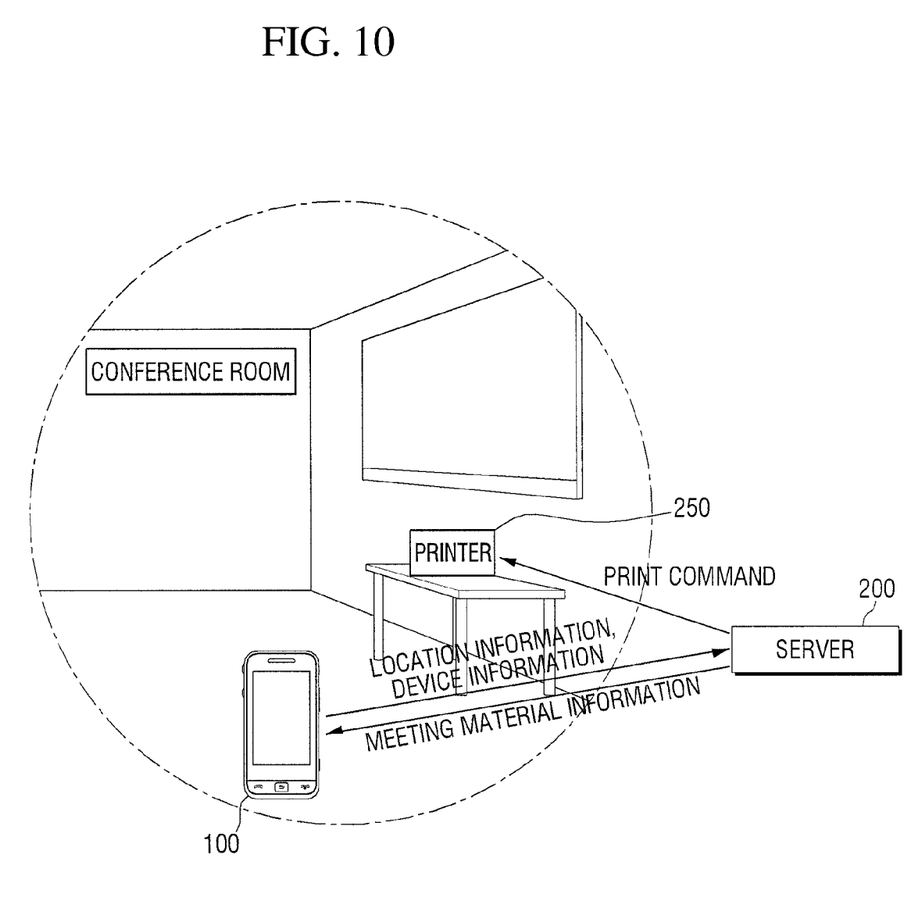
FIG. 10 is a diagram of a meeting material content information providing and printing process when a mobile device enters into a region corresponding to a conference room according to an exemplary embodiment of the present invention.

FIG. 10 is a diagram of a meeting material content information providing and printing process when the mobile device 100 enters into a region corresponding to the conference room according to an exemplary embodiment of the present invention.

When the mobile device 100 enters into the specific region 10 corresponding to the conference room as shown in FIG. 10, the mobile device 100 transmits the location information and the device information to the server 200.

In response, the server 200 transmits meeting material information corresponding to the content information to the mobile device 100. For example, the meeting material information may be a meeting plan, a meeting related document, and so on.

Accordingly, when the mobile device 100 receives the content information from the server 200, the user can check the meeting material information (for example, the meeting plan and the meeting related document) through the screen of the mobile device 100. The user can also input the print command for the conference materials through the mobile device 100. When the print is input by the user, the mobile device 100 processes to print the meeting materials.

In FIG. 10, the mobile device 100 cannot communicate with the printer 250. Thus, the mobile device 100 sends the print command to the server 200 and the server 200 sends the print command to the printer 250. However, when the mobile device 100 can communicate with the printer 250, the mobile device 100 may send the print command directly to the printer 250. Accordingly, by entering into the conference room region, the mobile device 100 receives the meeting related content from the server 200 and prints them using the printer 250.

As a result, the user can check the meeting plan and the meeting related material which are the meeting related content, through the mobile device 100 by merely carrying the mobile device 100 near the conference room. Since the user can use the mobile device 100 to print the meeting plan and the meeting related material using the printer 250 in the conference room in advance, the user can obtain the meeting plan and the meeting related material printed by the printer 250 in the conference room by merely carrying the mobile device 100 near the conference room.

As stated above, by carrying the mobile device 100 into the specific region, the user can receive the content suitable for the location from the server 200, check the content through the mobile device 100, and print the content using the printer 250.

According to exemplary embodiments of the present invention, the mobile device 100 may be any device capable of detecting the current location and downloading the content. For example, the mobile device 100 may be a mobile phone, a TV, an MP3, a PMP, a notebook, and a computer which can transmit and receive data. Similarly, the server 200 may be any server capable of transmitting the content to the mobile device 100.

While the invention has been shown and described with reference to certain exemplary embodiments thereof, it will be understood by those skilled in the art that various changes in form and details may be made therein without departing from the spirit and scope of the invention as defined in the appended claims and their equivalents.

The invention claimed is:

1. A content managing method of a mobile device capable of communicating with a server, the method comprising:
  displaying, if the mobile device enters into a specific region that is defined by a user of the mobile device, a message indicating that the mobile device has entered into the specific region;
  transmitting, if a user input is received in response to displaying the message, location information of the mobile device and device information of the mobile device to the server, the server having content corresponding to the location information of the mobile device pre-stored therein;
  receiving the content corresponding to the location information from the server; and
  transmitting a command for printing content to the server in response to receiving a user input for printing the content,
  wherein the server, in response to receiving the location information of the mobile device and the device information of the mobile device, identifies the mobile device based on the device information of the mobile device, converts a first resolution of the content corresponding to the location information of the mobile device to a second resolution which is playable in the mobile device, and transmits the converted content, and
  wherein the server has a driver for executing a printing function on a printing device and prints the converted content through the printing device using the driver.

2. The content managing method of the mobile device of claim 1, wherein the content corresponding to the location information comprises a document.

3. The content managing method of the mobile device of claim 1, wherein the location information is detected by a Global Positioning System (GPS).

4. The content managing method of the mobile device of claim 1, wherein the content corresponding to the location information comprises content used at a location corresponding to the location information and comprises information relating to content registered to the server.

5. The content managing method of the mobile device of claim 1, wherein user manipulation comprises user manipulation for shaking the mobile device.

6. The content managing method of the mobile device of claim 1, wherein the device information comprises at least one of model name of the mobile device, a manufacturer of the mobile device, a serial number of the mobile device and a user identification.

7. A content managing method of a content management system comprising a mobile device and a server capable of communicating with each other, the method comprising:
  displaying, at the mobile device, if the mobile device enters into a specific region that is defined by a user of the mobile device, a message indicating that the mobile device has entered into the specific region;
  transmitting, if a user input is received in response to displaying the message, location information of the mobile device and device information of the mobile device to the server, the server having content corresponding to the location information of the mobile device pre-stored therein;
  searching, at the server, for the content corresponding to the location information based on the device information;
  transmitting, at the server, the content to the mobile device; and
  receiving, at the server, a command for printing the content to a printing device located in the specific region corresponding to the content, in response to a user input,
  wherein the server, in response to receiving the location information of the mobile device and the device information of the mobile device, identifies the mobile device based on the device information of the mobile device, converts a first resolution of the content corresponding to the location information of the mobile device to a second resolution which is playable in the mobile device, and transmits the converted content, and
  wherein the server has a driver for executing a printing function on the printing device and prints the converted content through the printing device using the driver.

8. A mobile device comprising:
  a communication unit configured to:
    transmit location information and device information to a server, and
    receive content related to the location information from the server, the server having content corresponding to the location information of the mobile device pre-stored therein;
  a location determining unit configured to determine a location of the mobile device; and
  a controller configured to:
    display, if the mobile device is in a specific region that is defined by a user of the mobile device, a message indicating that the mobile device has entered into the specific region,
    generate the location information based on the location determined by the location determining unit,
    control the communication unit to transmit the location information to the server, and
    control the communication unit to transmit a command for printing the content to the server in response to receiving a user input for printing the content,
  wherein the controller is further configured to control the communication unit to transmit the location information and the device information to the server if the controller determines that a user input is received in response to displaying the message,
  wherein the server, in response to receiving the location information of the mobile device and the device information of the mobile device, identifies the mobile device based on the device information of the mobile device, converts a first resolution of the content corresponding to the location information of the mobile device to a second resolution which is playable in the mobile device, and transmits the converted content, and
  wherein the server has a driver for executing a printing function on a printing device and prints the converted content through the printing device using the driver.

* * * * *